(12) United States Patent
Cantrell

(10) Patent No.: US 10,535,036 B2
(45) Date of Patent: Jan. 14, 2020

(54) SYSTEMS AND METHODS FOR DELIVERING PRODUCTS TO A CUSTOMER VIA ANOTHER CUSTOMER AND AN AUTONOMOUS TRANSPORT VEHICLE

(71) Applicant: Walmart Apollo, LLC, Bentonville, AR (US)

(72) Inventor: Robert L. Cantrell, Herndon, VA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/100,704

(22) Filed: Aug. 10, 2018

(65) Prior Publication Data

US 2019/0066045 A1 Feb. 28, 2019

Related U.S. Application Data

(60) Provisional application No. 62/550,134, filed on Aug. 25, 2017.

(51) Int. Cl.
*G06Q 10/08* (2012.01)
*G05D 1/02* (2006.01)
*G01S 19/42* (2010.01)

(52) U.S. Cl.
CPC ........ *G06Q 10/0834* (2013.01); *G01S 19/42* (2013.01); *G05D 1/0225* (2013.01); *G05D 1/0276* (2013.01); *G06Q 10/0836* (2013.01); *G06Q 10/08355* (2013.01); *G05D 2201/0213* (2013.01)

(58) Field of Classification Search
CPC ........... G06Q 10/0834; G06Q 10/0836; G06Q 10/08355; G01S 19/42; G05D 1/0225; G05D 1/0276; G05D 2201/0213

USPC ........................................................ 705/334
See application file for complete search history.

(56) References Cited

U.S. PATENT DOCUMENTS

| 6,240,362 B1 | 5/2001 | Gaspard, II |
| 6,385,537 B2 | 5/2002 | Gaspard, II |
| 6,411,897 B1 | 6/2002 | Gaspard, II |
| 6,806,807 B2 | 10/2004 | Cayne |
| 7,113,071 B2 | 9/2006 | Cayne |
| 7,257,552 B1 | 8/2007 | Franco |
| 7,840,427 B2 | 11/2010 | O'Sullivan |
| 7,945,469 B2 | 5/2011 | Cohen |
| 7,945,470 B1 | 5/2011 | Cohen |

(Continued)

OTHER PUBLICATIONS

Grippa et. al.; Job Selection in a Network of Autonomous UAVs for Delivery of Goods; 2016 (Year: 2016).*

(Continued)

*Primary Examiner* — Kevin H Flynn
*Assistant Examiner* — Dione N. Simpson
(74) *Attorney, Agent, or Firm* — Fitch, Even, Tabin and Flannery LLP

(57) ABSTRACT

In some embodiments, methods and systems are provided that provided for delivering products ordered by a customer of a retailer to a delivery destination designated by the ordering customer by way of having another customer pick up the ordered products at the store location of the retailer and then hand off the picked up products to an autonomous transport vehicle that delivers the handed off products to a delivery destination designated by the ordering customer.

20 Claims, 3 Drawing Sheets

(56) References Cited

U.S. PATENT DOCUMENTS

| | | | |
|---|---|---|---|
| 8,066,186 B2* | 11/2011 | Kidwell | B65D 5/38 206/216 |
| 8,160,972 B1 | 4/2012 | Tannenbaum | |
| 8,554,694 B1 | 10/2013 | Ward | |
| 9,066,206 B2 | 6/2015 | Lin | |
| 9,070,101 B2 | 6/2015 | Abhyanker | |
| 9,202,191 B2 | 12/2015 | Bowen | |
| 9,230,292 B2 | 1/2016 | Amin | |
| 9,269,103 B1 | 2/2016 | Kumar | |
| 9,305,310 B2 | 4/2016 | Radhakrishnan | |
| 9,378,479 B2 | 6/2016 | Seifen | |
| 9,412,280 B1 | 8/2016 | Zwillinger | |
| 9,459,622 B2 | 10/2016 | Abhyanker | |
| 9,550,577 B1 | 1/2017 | Beckman | |
| 9,573,684 B2 | 2/2017 | Kimchi | |
| 9,639,908 B1 | 5/2017 | Reiss | |
| 9,718,397 B2 | 8/2017 | Kalanick | |
| 9,721,224 B2 | 8/2017 | Waris | |
| 9,778,057 B2 | 10/2017 | O'Mahony | |
| 9,786,187 B1* | 10/2017 | Bar-Zeev | G06Q 10/08355 |
| 9,792,574 B2 | 10/2017 | Lord | |
| 9,805,536 B2 | 10/2017 | Lutnick | |
| 9,811,838 B1 | 11/2017 | Daire | |
| 9,852,551 B2 | 12/2017 | Brinig | |
| 9,902,310 B2 | 2/2018 | Fournier | |
| 9,904,900 B2 | 2/2018 | Cao | |
| 9,928,540 B1 | 3/2018 | Gerard | |
| 9,934,530 B1 | 4/2018 | Iacono | |
| 2003/0040944 A1 | 2/2003 | Hileman | |
| 2003/0046173 A1 | 3/2003 | Benjier | |
| 2006/0026030 A1 | 2/2006 | Jacobs | |
| 2007/0192111 A1 | 8/2007 | Chasen | |
| 2009/0106034 A1 | 4/2009 | Giacalone | |
| 2011/0059693 A1 | 3/2011 | O'Sullivan | |
| 2012/0030133 A1 | 2/2012 | Rademaker | |
| 2014/0058902 A1 | 2/2014 | Taylor | |
| 2014/0149244 A1 | 5/2014 | Abhyanker | |
| 2014/0236856 A1 | 8/2014 | Baykhurazov | |
| 2014/0278634 A1 | 9/2014 | Horvitz | |
| 2014/0278851 A1 | 9/2014 | Kopanati | |
| 2014/0278875 A1 | 9/2014 | Ganesh | |
| 2015/0006005 A1* | 1/2015 | Yu | G06Q 10/08 701/22 |
| 2015/0081581 A1 | 3/2015 | Gishen | |
| 2015/0120094 A1 | 4/2015 | Kimchi | |
| 2015/0161563 A1 | 6/2015 | Mehrabi | |
| 2015/0199632 A1 | 7/2015 | Chander | |
| 2015/0206093 A1 | 7/2015 | Trew | |
| 2015/0227890 A1 | 8/2015 | Bednarek | |
| 2015/0242829 A1 | 8/2015 | Bhaskaran | |
| 2015/0277440 A1 | 10/2015 | Kimchi | |
| 2015/0339625 A1 | 11/2015 | Agasti | |
| 2015/0347961 A1 | 12/2015 | Gillen | |
| 2015/0348173 A1 | 12/2015 | Gillen | |
| 2015/0363843 A1 | 12/2015 | Loppatto | |
| 2015/0379468 A1 | 12/2015 | Harvey | |
| 2016/0019669 A1 | 1/2016 | Gopalakrishnan | |
| 2016/0048804 A1 | 2/2016 | Paul | |
| 2016/0071056 A1 | 3/2016 | Ellison | |
| 2016/0078394 A1 | 3/2016 | Fuldner | |
| 2016/0086128 A1 | 3/2016 | Geiger | |
| 2016/0098676 A1* | 4/2016 | Kusens | G06Q 10/0833 705/26.9 |
| 2016/0104112 A1 | 4/2016 | Gorlin | |
| 2016/0104113 A1 | 4/2016 | Gorlin | |
| 2016/0155072 A1 | 6/2016 | Prodromidis | |
| 2016/0163204 A1 | 6/2016 | Raptopoulos | |
| 2016/0189098 A1 | 6/2016 | Beaurepaire | |
| 2016/0195404 A1 | 7/2016 | Prasad | |
| 2016/0196755 A1 | 7/2016 | Navot | |
| 2016/0225115 A1 | 8/2016 | Levy | |
| 2016/0257401 A1 | 9/2016 | Buchmueller | |
| 2016/0328678 A1 | 11/2016 | Gillen | |
| 2016/0364678 A1 | 12/2016 | Cao | |
| 2016/0364679 A1 | 12/2016 | Cao | |
| 2016/0364812 A1 | 12/2016 | Cao | |
| 2016/0364823 A1 | 12/2016 | Cao | |
| 2016/0371650 A1* | 12/2016 | Schmidt | G06Q 30/0635 |
| 2016/0379167 A1 | 12/2016 | Raman | |
| 2017/0024805 A1* | 1/2017 | Tepfenhart, Jr. | G06Q 30/0635 |
| 2017/0032341 A1 | 2/2017 | Johnsrud | |
| 2017/0083862 A1 | 3/2017 | Loubriel | |
| 2017/0089710 A1 | 3/2017 | Slusar | |
| 2017/0091891 A1 | 3/2017 | Van Der Berg | |
| 2017/0110017 A1 | 4/2017 | Kimchi | |
| 2017/0116570 A1* | 4/2017 | Schroeder | G06Q 50/01 |
| 2017/0123421 A1* | 5/2017 | Kentley | G01S 17/87 |
| 2017/0124510 A1 | 5/2017 | Caterino | |
| 2017/0140326 A1 | 5/2017 | Rhyu | |
| 2017/0310770 A1 | 10/2017 | Samaan | |
| 2017/0316696 A1* | 11/2017 | Bartel | G08G 1/202 |
| 2017/0351994 A1 | 12/2017 | Waris | |
| 2018/0075407 A1* | 3/2018 | Chivukula | G06Q 10/0834 |
| 2018/0075565 A1* | 3/2018 | Myers | G05D 1/0088 |
| 2018/0096414 A1 | 4/2018 | Iacono | |

OTHER PUBLICATIONS

The Robotic Grocery Store of the Future Is Here, Mar.-Apr. 2017, MIT Technology Review, vol. 120, No. 2 (Year: 2017).*
PCT; App. No. PCT/US2018/047451; International Search Report and Written Opinion dated Jan. 11, 2019.
"Crowd-shipping: Is crowd-sourced the secret recipe for delivery in the future?"; GC.comm Commerce and Communication to the Point; Issue I; 2016; pp. 6-9.
"DHL crowd sources deliveries in Stockholm with MyWays"; http://www.dpdhl.com/en/media_relations/press_releases/2013/dhl_crowd_sources_deliveries_stockholm.html; Sep. 3, 2013; pp. 1-2.
Bensinger, Greg; "Amazon's Next Delivery Drone: You"; http://www.wsj.com/articles/amazon-seeks-help-with-deliveries-1434466857; Jun. 16, 2015; pp. 1-5.
Petersen, Ryan "How DHL Pioneered the Sharing Economy"; https://techcrunch.com/2016/02/13/howdhlpioneeredthesharingeconomy/; Feb. 13, 2016; pp. 1-12.

* cited by examiner

SYSTEMS AND METHODS FOR DELIVERING PRODUCTS TO A CUSTOMER VIA ANOTHER CUSTOMER AND AN AUTONOMOUS TRANSPORT VEHICLE

CROSS-REFERENCE TO RELATED APPLICATION

This application claims the benefit of U.S. Provisional Application No. 62/550,134, filed Aug. 25, 2017, which is incorporated herein by reference in its entirety.

TECHNICAL FIELD

This disclosure relates generally to delivering products and, in particular, to delivering products to customers via other customers and autonomous transport vehicles.

BACKGROUND

Customers often purchase products from retailers over the internet. Generally, the products purchased by a customer are delivered to a physical address provided by the customer, for example, a home where the customer lives, or an office where the customer works. Typically, products, ordered by customers of a retailer are loaded into a delivery vehicle of the retailer (or a delivery service used by the retailer) and delivered one by one to each customer's designated delivery location (e.g., home). Generally, it may be more cost-efficient for the retailers to have a customer of a retailer pick up internet-ordered products from the store of the retailer for other customers of the retailer who are located in geographic proximity to the customer who picks up the products from the store, and then to have the customer who picks up the products drop off the products at the other customers' locations on his/her way home. However, some people may consider too much of an inconvenience to drive to multiple addresses of other customers on their way home from a retail store to drop off the products picked up at the store for the other customers.

BRIEF DESCRIPTION OF THE DRAWINGS

Disclosed herein are embodiments of apparatuses, methods, and systems pertaining to delivering of products purchased by consumers over the internet from a retailer. This description includes drawings, wherein.

Figure 1:
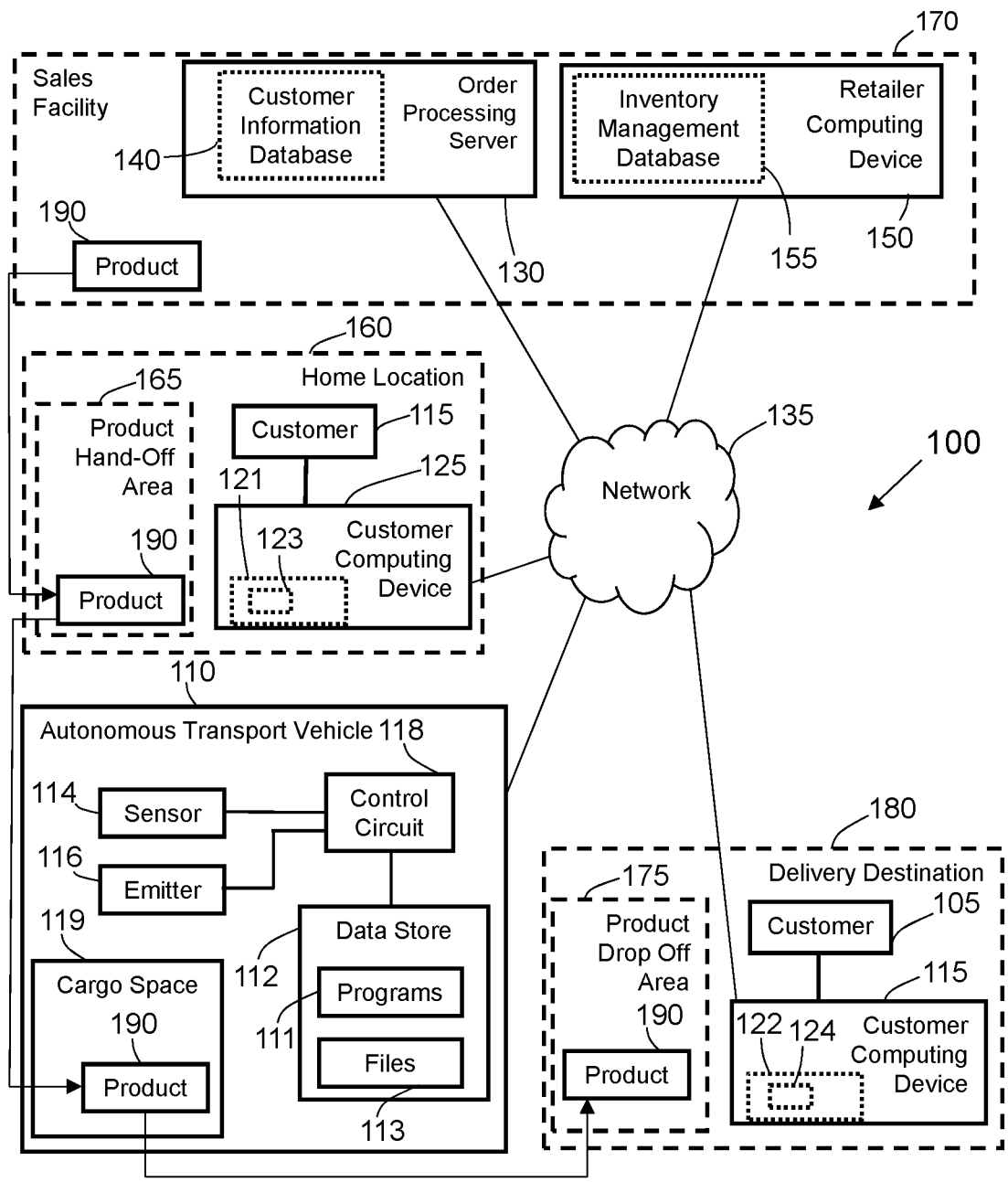
FIG. 1 is a diagram of a system for delivering products purchased by consumers over the internet from a retailer in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for delivering products ordered by a customer of a retailer to a delivery destination designated by the ordering customer by way of having another customer pick up the products of the ordering customer at the store location of the retailer and then hand off the picked up products (e.g., at a home location of the customer who picks up the products) to an autonomous transport vehicle that delivers the picked up products from the product hand-off location to the delivery destination designated by the ordering customer.

In some embodiments, a system for delivering products purchased by consumers over the internet from a retailer includes a retailer computing device including a processor-based control circuit. The retailer computing device is configured to: receive a first electronic notification indicating availability of a first customer of the retailer for product pick up at a sales facility of the retailer; transmit a second electronic notification to a computing device of the at least one other customer of the retailer, the second electronic notification permitting the at least one other customer of the retailer to place at least one order for at least one product to be picked up, at the sales facility of the retailer, by the first customer of the retailer; receive a third electronic notification from the customer device of the at least one other customer of the retailer, the third electronic notification indicating the at least one order, placed by the at least one other customer of the retailer for the at least one product to be picked up, at the sales facility of the retailer, by the first customer of the retailer; and receive an indication that the first customer of the retailer picked up, at the sales facility of the retailer, at least one package containing the at least one order placed by the at least one other customer of the retailer. The system further includes a plurality of autonomous transport vehicles each including an interior and configured to receive, at a home location of the first customer, in the interior, the at least one package containing the at least one order picked up, at the sales facility of the retailer, by the first customer of the retailer for the at least one other customer of the retailer. The retailer computing device is configured to: analyze at least a physical location, a maximum cargo capacity, and a delivery route of each of the autonomous transport vehicles to determine an availability ranking of the autonomous transport vehicles for delivering the at least one order to the at least one customer of the retailer; select the autonomous transport vehicle determined by the retailer computing device to have a highest availability ranking for delivering the at least one order to the at least one customer of the retailer, and transmit delivery route instructions to the selected autonomous transport vehicle. The selected autonomous transport vehicle is configured to: detect, via at least one sensor of the selected autonomous transport vehicle, a product hand-off area at the home location of the first customer where the at least one package containing the at least one order picked up by the first customer of the retailer at the sales facility of the retailer is dropped off by the first customer of the retailer; identify, via at least one sensor of the selected autonomous transport vehicle, the at least one package containing the at least one order picked up by the first customer of the retailer for the at least one other customer of the retailer; load the at least one package identified in the product hand-off area into the interior of the selected autonomous transport vehicle at the product hand-off area; and deliver, based on the delivery instructions received from the retailer computing device, the at least one package loaded into the interior of the selected autonomous transport vehicle at the product hand-off area to the geographic location of the at least one other customer of the retailer.

In some embodiments, a method of delivering products purchased by consumers over the internet from a retailer includes: receiving, at a retailer computing device including a processor-based control circuit, a first electronic notification indicating availability of a first customer of the retailer for product pick up at a sales facility of the retailer; transmitting, via the retailer computing device, a second electronic notification to a computing device of the at least one other customer of the retailer, the second electronic notification permitting the at least one other customer of the retailer to place at least one order for at least one product to be picked up, at the sales facility of the retailer, by the first customer of the retailer; receiving, via the retailer computing device, a third electronic notification from the computing device of the at least one other customer of the retailer, the third electronic notification indicating the at least one order, placed by the at least one other customer of the retailer for the at least one product to be picked up, at the sales facility of the retailer, by the first customer of the retailer; permitting the first customer of the retailer to pick up, at the sales facility of the retailer, at least one package containing the at least one order placed by the at least one other customer of the retailer; analyzing, via the retailer computing device, at least a physical location, a maximum cargo capacity, and a delivery route of a plurality of autonomous transport vehicles to determine an availability ranking of the autonomous transport vehicles for delivering the at least one package to the at least one customer of the retailer; selecting, via the retailer computing device, an autonomous transport vehicle determined by the retailer computing device to have a highest availability ranking for delivering the at least one package to the at least one other customer of the retailer; transmitting, via the retailer computing device, delivery route instructions to the selected autonomous transport vehicle; providing the selected autonomous transport vehicle at a home location of the first customer; detecting, via at least one sensor of the selected autonomous transport vehicle, a product hand-off area at the home location of the first customer where the at least one package containing the at least one order picked up by the first customer of the retailer at the sales facility of the retailer is dropped off by the first customer of the retailer; identifying, via at least one sensor of the selected autonomous transport vehicle, the at least one package containing the at least one order picked up by the first customer of the retailer for the at least one other customer of the retailer; loading the at least one package identified in the product hand-off area into the interior of the selected autonomous transport vehicle at the product hand-off area; and delivering, via the selected autonomous transport vehicle and based on the delivery instructions received from the retailer computing device, the at least one package loaded into the interior of the selected autonomous transport vehicle at the product hand-off area to the geographic location of the other customer(s) of the retailer who placed the at least one order.

FIG. 1 shows an embodiment of a system 100 for delivering of products purchased by customers over the internet from a retailer. It will be understood that the details of this example are intended to serve in an illustrative capacity and are not necessarily intended to suggest any limitations in regards to the present teachings. The retailer may be any entity operating as a brick-and-mortar physical location and/or a website accessible, for example, via the internet or another network, by way of which products 190 may be ordered by a consumer (e.g., customer of the retailer). A customer may be an individual or business entity. Exemplary products 190 that may be ordered by the customer via the system 100 may include, but are not limited to, general-purpose customer goods and consumable products (e.g., food items, medications, or the like).

The exemplary system 100 depicted in FIG. 1 includes an order processing server 130 of the retailer configured to process purchase orders by customers for one or more products 190. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 135.

The network 135 may be a wide-area network (WAN), a local area network (LAN), a personal area network (PAN), a wireless local area network (WLAN), Wi-Fi, ZigBee, Bluetooth (e.g., Bluetooth Low Energy (BLE) network), or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 is coupled to a customer information database 140. Generally, the customer information database 140 may be configured to store information associated with the customers of the retailer who order products 190 from the retailer and/or who pick up products at the sales facility 170 of the retailer for other customers. In some embodiments, the customer information database 140 may store electronic information including but not limited to: personal information associated with the customers of the retailer (e.g., name, address, payment information, product delivery options, etc.), as well as information (e.g., status) associated with any previous or pending orders placed by the customers and/or any orders picked up by certain customers for other customers.

The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based. In some embodiments, the order processing server 130 may be also coupled to an electronic database configured to store information associated with the inventory of products 190 made available by the retailer to the customer. In other words, while the order processing server 130 of FIG. 1 is shows as coupled to one electronic database (i.e., customer information database 140), it will be appreciated that the order processing server 130 may be additionally coupled to an electronic database akin to the inventory management database 155 configured to store product inventory information.

In some embodiments, when a customer initially sets up an online account with the retailer, the system 100 (i.e., order processing server 130 or another server on the system 100 dedicated to new customer sign-up) is configured to permit the customer to generate a customer profile including personal information of the customer (e.g., name, home address, work address, phone number, and the like), payment methods (e.g., credit card information), as well as product delivery settings of the customer (e.g., preferred delivery address and/or preferred delivery method). It will be appreciated that the customer may select new options and/or update previously selected options at any time after setting up the account with the retailer. In some embodiments, the personal information of the customer and any product delivery options selected by the customer are stored in the customer information database 140 for subsequent retrieval by the order processing server 130 and/or by a retailer computing device 150 (e.g., in response to a login request by the customer, or product order placement by the customer).

With reference to FIG. 1, customer 105 may access the order processing server 130 of the retailer via a customer computing device 120, which may be a stationary, portable, and/or hand-held electronic device, for example, a desktop computer, a laptop computer, a tablet, a mobile phone, or any other electronic, processor-based device that may be configured for data entry and communication with the order processing server 130 over the network 135. In some embodiments, customer 105 may access the order processing server 130 of the retailer via a graphical interface 122 displayed to customer 105 on the customer computing device 120. The graphical interface 122 may include one or more graphical input fields 124 in the form of menu options and/or sub-interfaces that permit customer 105 to place an order for one or more products 190 and to select a delivery option for one or more products 190 ordered by customer 105. In some embodiments, the graphical interface 122 may be a retailer-associated mobile application (app) installed on the customer computing device 120 and configured to display various above-described menu options, notifications, and/or alerts for customer 105. For example, electronic alerts may be transmitted to the customer computing device 120 via the network 135 from the retailer computing device 150 and/or from the order processing server 130 and displayed to customer 105 via the graphical interface 122.

In some embodiments, as customer 105 is attempting to connect (e.g., via the computing device 120 of customer 105 (e.g., a cell phone)) to the retailer's website (or retailer's mobile phone app), the order processing server 130 may request a verification of the identity (e.g., username/password) of customer 105. The order processing server 130 may first verify the identity of customer 105 (e.g., by comparing the username/password data entered by customer 105 into the login interface against username/password data in the profile of customer 105 stored in the customer information database 140). The order processing server 130 may then associate the customer profile with the identity of customer 105, retrieve the customer profile from the customer information database 140 based on information stored in the profile, and send the retrieved customer account information to the customer computing device 120, which includes a graphical interface 122 including one or more input fields 124 that permit customer 105 to customize various options relating to the ordering of products 190 from the retailer and/or the delivering of the ordered products 190 to customer 105.

In some embodiments, after receiving a notification from the retailer computing device 150 that permits customer 105 to place an order for a product 190 such that the product 190 ordered by customer 105 is to be picked up by another customer 115 of the retailer and delivered to a delivery destination 180 designated by customer 105 via an autonomous transport vehicle (ATV) 110. The ATV 110 may be an autonomous ground vehicle (AGV) and/or an unmanned aerial vehicle (UAV or drone). It will be appreciated that in some embodiments, the system 100 may utilize a combination of AGVs and UAVs as the autonomous transport vehicle to effectuate the delivery of a product 190 picked up by customer 115 at the sales facility 170 to a delivery destination 180 designated by customer 105. A delivery destination 180 may include but is not limited to a home of customer 105, a work address of customer 105, another address designated by customer 105, or detected a geographic location of the computing device 120 of customer 105. While FIG. 1 illustrates customer 105 as being located at the delivery destination 180, it will be appreciated that customer 105 may place an order for the products 190 over the network 135 while being remote to the delivery destination 180, and does not have to be at the delivery destination 180 when the ATV 110 delivers the products 190 (for drop off or acceptance by an authorized person) to the delivery destination 180.

In some embodiments, the order processing server 130 is configured to receive and process an order for a product 190 placed by a customer 105 via the customer computing device 120, to receive and process payment for the product 190 from customer 105, and to transmit (e.g., to the retailer computing device 150 via the network 135) the selection by customer 105 of an option to have the ordered products 190 be picked up at the sales facility 170 by another customer 115 and to be delivered to a delivery destination 180 designated by customer 105 by an ATV 110. It will be appreciated that the order processing server 130 has been illustrated as being located at the sales facility 170 by way of example only, and that the order processing server 130 may be remote to the sales facility 170 (e.g., at a regional/central data center, product distribution center, or the like). In addition, it will be appreciated that the order processing server 130 has been illustrated as being at the same location (i.e., sales facility 170) as the retailer computing device 150 by way of example only, and that the order processing server 130 and the retailer computing device 150 may be located at different facilities in some embodiments.

The retailer computing device 150 may be a stationary or portable electronic device, for example, a desktop computer, a laptop computer, a tablet, a mobile phone, or any other electronic device including a processor-based control circuit (i.e., control unit). For purposes of this specification, the term "retailer computing device" will be understood to refer to a computing device owned by the retailer or any computing device owned and/or operated by an entity (e.g., delivery service, worker of the retailer, etc.) having an obligation to deliver products 190 to or for the retailer. In the embodiment of FIG. 1, the retailer computing device 150 is configured for data entry and processing as well as for communication with other devices of system 100 via the network 135. In some embodiments, as will be described below, the retailer computing device 150 is configured to access one or more of the inventory management database 155 and customer information database 140 via the network 135 to facilitate delivery of the products 190 ordered by customer 105 via the ATV 110 to a delivery destination 180 selected by customer 105.

Figure 2:
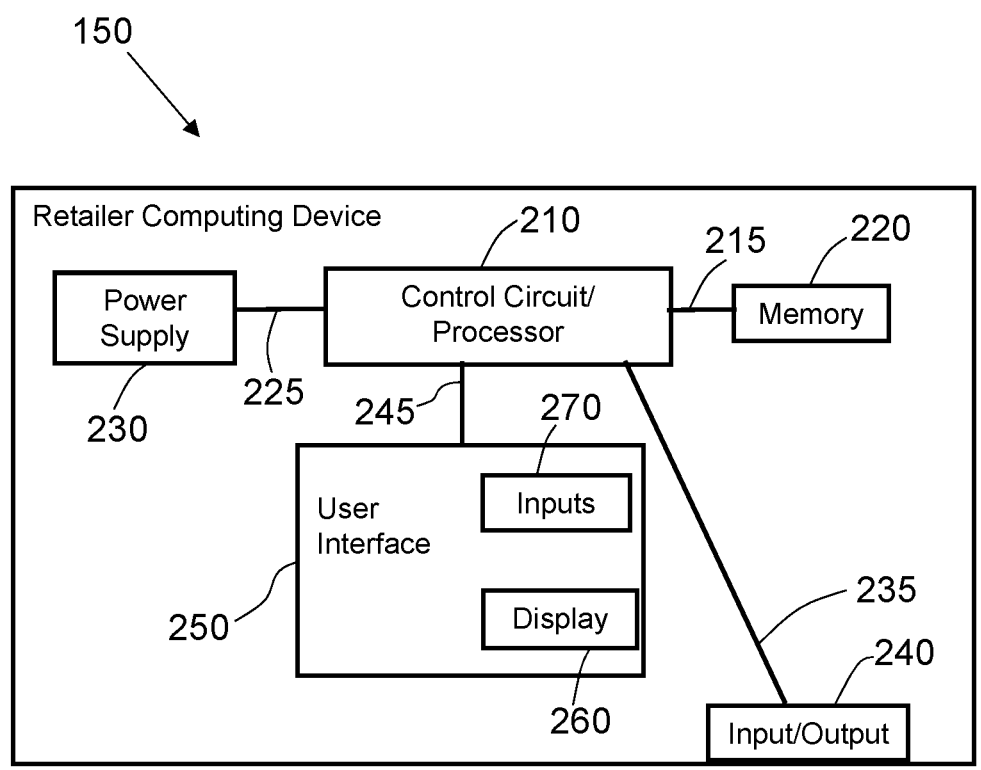
FIG. 2 is a functional diagram of an exemplary retailer computing device usable with the system of FIG. 1 in accordance with some embodiments.

In the exemplary system 100 of FIG. 1, the retailer computing device 150 is in two-way communication with the order processing server 130, the customer computing device 120 (of customer 105), the computing device 125 (of customer 115), and/or the ATV 110 via the network 135. With reference to FIG. 2, an exemplary retailer computing device 150 configured for use with the systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. While the retailer computing device 150 and the order processing server 130 have been illustrated in FIG. 1 as two separate and distinct devices, it will be appreciated that in some embodiments, the retailer computing device 150 may incorporate the order processing server 130 and vice versa.

The control unit 210 of the retailer computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Thus, the memory and/or the control unit may be referred to as a non-transitory medium or non-transitory computer readable medium.

The control unit 210 of the retailer computing device 150 is also electrically coupled via a connection 235 to an input/output 240 that can receive signals from the order processing server 130 (e.g., data from the customer information database 140 relating to an order for a product 190 placed by customer 105 and/or information (e.g., GPS coordinates) associated with a physical location of the ATV 110 and/or delivery destination 180 selected by customer 105), or from any other source that can communicate with the retailer computing device 150 via a wired or wireless connection over the network 135. The input/output 240 of the retailer computing device 150 can also send signals to the order processing server 130 (e.g., electronic notification confirming retrieval of the product 190 by customer 105 from the ATV 110), as well as to the ATV 110 (e.g., notification of selection for delivery of at least one package to customer 105, route instructions to guide the ATV 110 from the product hand-off area 165 at the home location 160 of customer 115 to the delivery destination 180, etc.), or to any other device in wired or wireless communication with the retailer computing device 150.

In the embodiment shown in FIG. 2, the processor-based control unit 210 of the retailer computing device 150 is electrically coupled via a connection 245 to a user interface 250, which may include a visual display or display screen 260 (e.g., LED screen) and/or button input 270 that provide the user interface 250 with the ability to permit an operator of the retailer computing device 150 to manually control the retailer computing device 150 by inputting commands via touch-screen and/or button operation and/or voice commands to, for example, to communicate with the computing device 120 of customer 105 and/or the computing device 125 of customer 115 and/or an ATV 110 over the network 135. It will be appreciated that the performance of such functions by the processor-based control unit 210 of the retailer computing device 150 is not dependent on a human operator, and that the control unit 210 may be programmed to perform such functions without a human operator.

In some embodiments, the display screen 260 of retailer computing device 150 is configured to display various graphical interface-based menus, options, and/or alerts that may be transmitted to the retailer computing device 150 and displayed on the display screen 260 in connection with various aspects of the order placed by customer 105, including the pick-up of the order by customer 115 and the delivery of the order by the ATV 110 from the product hand-off area 165 at the home location 160 of customer 115 to the product drop off area 175 at the delivery destination 180 designated by customer 105. The inputs 270 of the retailer computing device 150 may be configured to permit an operator to navigate through the on-screen menus on the retailer computing device 150 and make changes and/or updates to the delivery destination 180 designated by customer 105 for delivery of the products 190 and/or the delivery route of the ATV 110. It will be appreciated that the display screen 260 may be configured as both a display screen and an input 270 (e.g., a touch-screen that permits an operator to press on the display screen 260 to enter text and/or execute commands.)

In some embodiments, the control circuit 210 of the retailer computing device 150 is programmed to determine that one or more products 190 ordered by customer 105 via the retailer computing device 150 and/or order processing server 130 is to be picked up, at the sales facility 170, by customer 115 (and later delivered via an ATV 110 to the delivery destination 180 designated by customer 105). For example, the retailer computing device 150 is configured, in some embodiments, to receive over the network 135 an electronic notification (e.g., from the computing device 125 and/or order processing server 130) indicating availability of a first customer 115 of the retailer for product pick up at the sales facility 170 of the retailer (e.g., customer 115 may arrive at the sales facility 170 to purchase products for himself/herself, specifically to pick up products 190 for other customers, or another reason). Such a notification may be transmitted, for example, by the computing device 125 over the network 135 to the retailer computing device 150 via one or more of a mobile app notification, a shortmessage-service (SMS) message, a, electronic mail, and an instant messenger message, or the like.

In some embodiments, the retailer computing device 150 is configured to transmit over the network 135 an electronic notification to the computing device 120 of customer 105 to permit customer 105 to place one or more orders for one or more products 190 to be picked up, at the sales facility 170, by customer 115 (and later delivered via an ATV 110 to the delivery destination 180 designated by customer 105). In some aspects, such an electronic notification includes a graphical interface including at least one input field configured to enable customer 105 to select one or more products 190 to be included in the order and to submit one or more orders to be picked up, at the sales facility 170 of the retailer, by customer 115.

A determination of which customers (e.g., customer 105) receive an electronic notification that enables such customers to place an order to be picked up by customer 115 and delivered by the ATV 110 is, in some implementations, determined by physical proximity of such customers to a home location 160 of customer 115 (where it is presumably most convenient for customer 115 to hand off the products 190 picked up by customer 115 at the sales facility 170 to an ATV 110 for delivery to other customers (e.g., customer 105) who placed orders for products 190). For example, in some embodiments, in response to receipt of an electronic notification (e.g., from the computing device 125 and/or order processing server 130) indicating availability of a first customer 115 of the retailer for product pick up at the sales facility 170 of the retailer, the control circuit 210 of the retailer computing device 150 is programmed to confirm whether customer 115 is able (i.e., has cargo capacity) and is willing to pick up products 190 for other customers, and then to identify one or more customers (e.g., customer 105) located within a predefined geographic radius (e.g., ¼ mile, ½ mile, 1 mile, 2 miles, 3 miles, etc.) of the home location 160 of customer 115, which will be offered an opportunity to place one or more orders for products 190 to be picked up by customer 115 at the sales facility 170 for later delivery to such customer(s) by one or more ATVs 110.

In some embodiments, the aforementioned electronic notification transmitted from the retailer computing device 150 to customer 105 includes an input field 124 on the graphical interface 122 of the computing device 120 of customer 105, prompting customer 105 to select a delivery option, with one of the available options being delivery of the products 190 ordered by customer 105 via an ATV 110, following a pick up of the products 190 at the sales facility 170 by customer 115. In some aspects, the retailer computing device 150 is configured to provide, in such an electronic notification, an indication of a surcharge to customer 105 for having customer 115 pick up the order for customer 105 at the sales facility 170 of the retailer.

In some aspects, the control circuit 210 of the retailer computing device 150 is programmed to generate a delivery surcharge to be paid by customer 105 based on an analysis of the relative locations the home location 160 of customer 115 and the delivery destination 180 designated by customer 105. In some aspects, the control circuit 210 of the retailer computing device 150 is programmed to obtain an applicable surcharge from the order processing server 130 or from the customer information database 140. In one implementation, after customer 105 agrees to the surcharge (e.g., by clicking "YES" within the graphical interface 122 presented to customer 105 on the computing device 120), and after customer 115 agrees (e.g., via the graphical interface 121 presented to customer 115 on the computing device 125) to pick up the order placed by customer 105 from the sales facility 170, the retailer computing device 150 initiates a credit in the amount of the surcharge to an account of customer 115 for picking up the order, and a debit in the amount of the surcharge from the account of customer 105.

In one aspect, after customer 105 enters his or her order via the graphical interface 122, the retailer computing device 150 is configured to receive over the network 135 an electronic notification from the computing device 120 of customer 105 that indicates (e.g., by way of listing each product 190 being ordered) the order being submitted by customer 105 to be picked up, at the sales facility 170, by customer 115 (and later delivered via an ATV 110 to the delivery destination 180 designated by customer 105). In some embodiments, after receiving an indication of the order by customer 105, the retailer computing device 150 is programmed to relay the order information over the network 135 to the order processing server 130 for processing of the order, after which the order processing server 130 is configured to transmit the order information to the customer information database 140.

In some aspects, for an order submitted from the computing device 120 of customer 105 to the retailer computing device 150 to be processed, customer 115 has to first agree to pick up the products 190 ordered by customer 105 from the sales facility 170. In one aspect, the retailer computing device 150 is configured to, after receipt of an electronic notification from the computing device 120 indicating the order submitted by customer 105, to transmit an electronic notification over the network 135 to the computing device 125 of customer 115. Such an electronic notification may include a graphical interface (e.g., text-based question and "YES"/"NO" or "AGREE"/"DISAGREE" clickable icons, etc.) configured to permit customer 115 to agree or disagree to pick up, at the sales facility 170, the order placed by customer 105.

In one aspect, after receiving, from the computing device 125, an indication of agreement by customer 115, the retailer computing device 150 is programmed to relay the order information (e.g., list of products being ordered) over the network 135 to the order processing server 130 for processing of the order (after which the order processing server 130 is configured to transmit the order information to the customer information database 140). In some configurations, the retailer computing device 150 is programmed to transmit an electronic notification to an electronic device of a worker at the sales facility 170, instructing the worker to pick the products 190 purchased by customer 105 from their storage locations and to pack the products 190 (e.g., into a labeled package specific to customer 105) in preparation for pick up by customer 115, such that when customer 115 arrives at the sales facility 170, the packaged products 190 ordered by customer 105 are ready to be picked up by customer 115. Conversely, if the retailer computing device receives an indication of disagreement or inability by customer 115 to pick up the products 190 for customer 105, the retailer computing device 150 is programmed to query the customer information database 140 and select one or more other possible customers for picking up from the sales facility 170 the order placed by customer 105, to reassign pick up of the order placed by customer 105 to another customer, and/or to cancel the order placed by customer 105 if no alternative customer who agrees to pick up the order placed by customer 105 can be identified.

In some embodiments, the retailer computing device 150 is configured to receive (e.g., from the order processing server 130 and/or computing device 125 of customer 115)

over the network 135 an electronic notification that indicates the order placed by customer 105 was picked up by customer 115 at the sales facility 170. In some embodiments, the products 190 ordered by customer 105 are packaged at the sales facility 170 such that the package containing the products 190 ordered by customer 105 does not provide a visible indication to customer 115 of the products 190 contained therein, thereby preserving the privacy of customer 105.

In some aspects, the control circuit 210 of the retailer computing device 150 is programmed to determine which ATV 110 is optimally suited for picking up the products 190 picked up by customer 115 at the sales facility 170 from the home location 160 of customer 115, and to deliver such products 190 to a delivery destination 180 indicated by customer 105. In certain implementations, the control circuit 210 is configured to make this determination based on an analysis of various factors pertaining to the ATV 110, home location 160 of customer 115, and delivery destination 180 designated by customer 105, and calculating an availability ranking of the ATVs 110 from which the retailer computing device 150 is permitted to select from. In one aspect, the control circuit 210 of the retailer computing device 150 is configured to calculate such an availability ranking of the ATVs 110 after analyzing a physical location, a maximum cargo capacity, and a delivery route of one or more of the ATVs 110 utilized by the system 100 under the control of retailer computing device 150.

It will be appreciated that the control circuit 210 of the retailer computing device 150 may be programmed to generate the availability ranking of the ATVs 110 based on more than the three factors identified above. In other words, in performing its analysis to arrive at the ATV availability ranking, the control circuit 210 of the retailer computing device 150 may be programmed to analyze other factors, including but not limited to: battery range of the ATVs 110, locations of the ATV-deploying mothership, etc. In addition, it will be appreciated that the control circuit 210 of the retailer computing device 150 may be programmed to analyze the ATVs 110 that are actively delivering products 190 along delivery routes to other customers of the retailer at the time of the analysis and/or that are not actively tasked with any specific deliveries and are stationed at product distribution centers and/or mobile ATV deployment stations at the time of the analysis.

In certain implementations, the control circuit 210 of the retailer computing device 150 is configured to give the highest ranking to an ATV 110 that has the capacity to pick up the package containing the products 190 (ordered by customer 105) from the home location 160, and which has an assigned delivery route that is most proximal to the home location 160 as compared to other ATVs 110. In one aspect, the control circuit 210 of the retailer computing device 150 is configured to give the highest ranking to an ATV 110 that has the capacity to pick up the package containing the products 190 (ordered by customer 105) from the home location 160, and which is detected to be located most proximally to the home location 160 as compared to other ATVs 110, either while performing the task of delivering products 190 along pre-assigned delivery routes or while being stationed at a location from which the ATVs 110 may be deployed (e.g., stationary or mobile deployment mothership).

In some aspects, the retailer computing device 150 is further configured to receive (e.g., from the computing device 125 of customer 115) over the network 135 an electronic notification indicating that the order picked up by customer 115 at the sales facility 170 has been dropped off by customer 115 in a product hand-off area 165 (e.g., a driveway, front yard, etc.) at the home location 160 of customer 115. In one aspect, such an electronic location notifies the retailer computing device 150 that the package containing the products 190 ordered by customer 105 is ready to be picked up by the ATV 110 in the product hand-off area 165. In another aspect, such an electronic notification notifies the retailer computing device 150 that the package containing the products 190 ordered by customer 105 has been loaded into the ATV 110 at the product hand-off area 165. In some embodiments, the ATV 110 arrives at the product hand-off area 165 of the home location 160 prior to the customer 115 arriving at the home location 160 from the sales facility 170.

It will be appreciated that the term "home location" will be understood as a location where customer 115 resides (e.g., house, apartment building, hotel, etc.), works (office building, business, etc.), or otherwise chooses as a location convenient for handing off products 190 picked up by customer 115 at the sales facility 170 to an ATV 110 for delivery to the delivery destination 180 chosen by customer 105. It will be appreciated that the term "delivery destination" will be understood as a location where customer 105 resides (e.g., house, apartment building, hotel, etc.), works (office building, business, etc.), or otherwise chooses as a location convenient for receiving delivery of products 190 picked up by customer 115 at the sales facility 170 and handed off to an ATV 110 for delivery to customer 105.

In one aspect, after receiving an electronic notification indicating that the order picked up by customer 115 at the sales facility 170 has been dropped off by customer 115 in a product hand-off area 165 at the home location 160 of customer 115, the control circuit 210 of the retailer computing device 150 is programmed to receive and/or otherwise obtain the physical location of the home location 160 and the location of the ATV 110 selected for delivering the order to the delivery destination 180. In one aspect, the control circuit 210 of the retailer computing device 150 is programmed to receive and/or otherwise obtain the physical location of the home location 160 and the location of the ATV 110 selected for delivering the order to the delivery destination 180 in response to receiving an electronic notification indicating that the order has picked up by customer 115 at the sales facility 170, such that the ATV 110 may be guided to and arrive at the home location 160 prior to the arrival of customer 115 at the home location 160.

In some embodiments, the control circuit 210 of the retailer computing device 150 is programmed to obtain global positioning system (GPS) coordinates of both the home location 160 of customer 115 selected for delivering the products 190 to customer 105 and the ATV 110 selected by the retailer computing device 150 for this task, as well as to analyze the obtained GPS coordinates to determine a route for the selected ATV 110 from its present location (e.g., mothership or preceding delivery location) to the home location 160 of customer 115. In one aspect, after the control circuit 210 of the retailer computing device 150 determines such a route for the selected ATV 110, the control circuit 210 is configured to cause the retailer computing device 150 to transmit an electronic notification to the ATV 110 including the route instructions to guide the selected ATV 110 to the home location 160.

In one aspect, prior to, or after the commencement of the delivery attempt of one or more products 190 by the ATV 110 to the delivery destination 180 designated for delivery by customer 105, the control circuit 210 of the retailer computing device 150 is programmed to receive and/or otherwise obtain the physical location of the home location 160 and the delivery destination 180. For example, in some embodiments, the control circuit 210 of the retailer computing device 150 is programmed to obtain global positioning system (GPS) coordinates of both the home location 160 of customer 115 selected for delivering the products 190 to customer 105 and the delivery destination 180 designated by customer 105 who placed the order, as well as to analyze the obtained GPS coordinates to determine a route for the selected ATV 110 from the home location 160 of customer 115 to the delivery destination 180 designated by customer 105. In one aspect, after the control circuit 210 of the retailer computing device 150 determines a delivery route for the selected ATV 110, the control circuit 210 is configured to cause the retailer computing device 150 to transmit an electronic notification to the selected ATV 110 including the delivery route instructions configured to guide the selected ATV 110 to the delivery destination 180 designated by customer 105.

In some embodiments, when the delivery of the product 190 via the ATV 110 from the home location 160 to the delivery destination 180 is in progress, and more specifically, after the ATV 110 has arrived at the delivery destination 180, the control unit 210 of the retailer computing device 150 is configured to receive, via the network 135, an authentication of an identity of customer 105 (or of an authorized person accepting delivery of the product 190 on behalf of customer 105) attempting to retrieve the product 190 from the ATV 110 (e.g., at the product drop off area 175). For example, as will be discussed in more detail below, in one aspect, the ATV 110 may include a video camera configured to visually inspect a physical identification card (e.g., Driver's License) of customer 105 or person attempting to accept delivery on behalf of customer 105, and to generate identity detection data. The ATV 110 may then transmit such identity detection data over the network 135 to the retailer computing device 150, after which the control unit 210 of the retailer computing device 150 is configured to obtain (e.g., from the customer information database 140) authentic identification data associated with the customer or authorized person to determine whether there is a match.

The control unit 210 of the retailer computing device 150 is further configured to send a return signal (via the input/output 240) to the ATV 110 to instruct the ATV 110 as to whether or not to grant access to the cargo space 119 of the ATV 110 to customer 105 or person attempting to accept delivery based on whether the identity detection data associated with customer 105 or person attempting to accept delivery matched the authentic identification data stored in the customer information database 140. In some embodiments, the control unit 210 of the retailer computing device 150 is configured to authorize the ATV 110 (e.g., via a transmission of a signal over the network 135 to the ATV 110) to unlock the cargo space 119 and permit customer 105 to retrieve (from the cargo space 119 of the ATV 110) a package containing the products 190 ordered by customer 105 based on the authentication of the identity of customer 105, which may be performed as described above. In one aspect, upon a successful completion of a delivery of the products 190 to customer 105 at the delivery destination 180, the control circuit is 210 of the retailer computing device 150 is configured to receive, over the network 135, from the computing device 120 of customer 105 and/or from the ATV 110, an electronic confirmation that the product 190 has been successfully delivered to customer 105 and retrieved by customer 105.

In some embodiments, the control circuit 210 of the retailer computing device 150 is programmed to generate alerts in connection with the delivery of the products 190 to customer 105 or a person authorized to receive the products 190 on behalf of customer 105. Such alerts may be generated by the retailer computing device 150 based on information received from the ATV 110. For example, such alerts may be transmitted from the retailer computing device 150 via the network 135 to the computing device 120, and the computing device 120 may transmit data responsive to the alerts and/or other data to the retailer computing device 150 via the network 135. In some aspects, the retailer computing device 150 may transmit a signal over the network 135 to the computing device 120 including an alert indicating that the ATV 110 has arrived at the delivery destination 180 designated by customer 105, or an alert indicating that the ATV 110 was unable to successfully reach the delivery destination 180. In some aspects, the retailer computing device 150 may transmit a signal over the network 135 to the computing device 120 including an alert indicating that the ATV 110 has dropped off the products 190 product drop off area 175 at the delivery destination 180 designated by customer 105, or an alert indicating that the ATV 110 was unable to successfully drop off the products 190. Similarly, the computing device 120 may transmit a signal over the network 135 to the retailer computing device 150 including a notification that the product 190 ordered by the customer has been successfully retrieved by customer 105 from the ATV 110 at the product drop off area 175 of the delivery destination 180.

Figure 3:
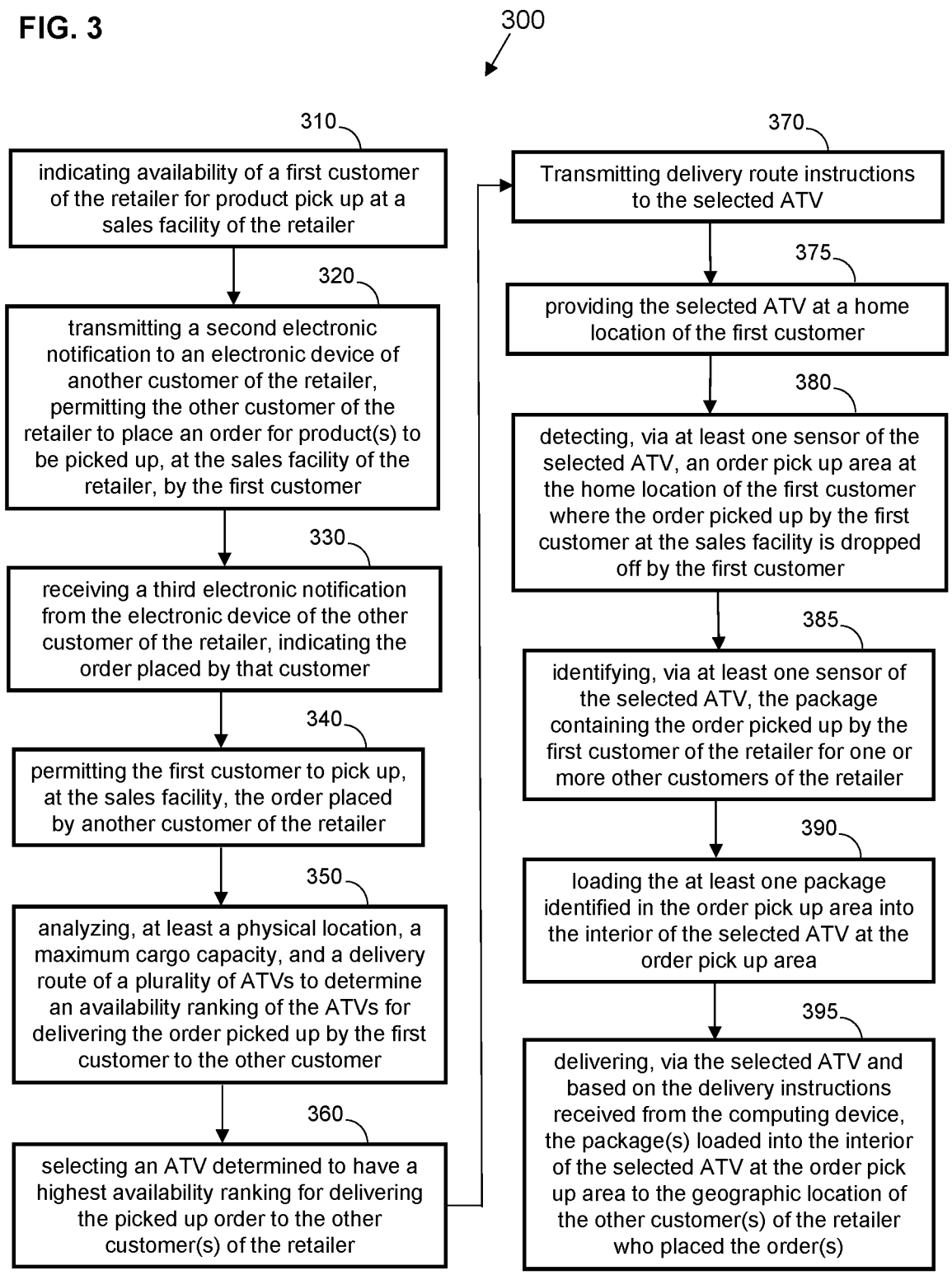
FIG. 3 is a flow chart diagram of a process of delivering products purchased by consumers over the internet from a retailer in accordance with some embodiments.

With reference to FIGS. 1 and 3, the ATV 110 is generally a vehicle configured to autonomously traverse one or more intended environments in accordance with one or more routes and/or determined paths, and typically without the intervention of a human or a remote computing device, while retaining products 190 in an interior thereof, and delivering the products 190 from the home location 160 (where customer 115 hands off the products 190 he/she picked up at the sales facility 170 for the ATV 110 to pick up and/or manually loads the products 190 into the ATV 110) to the delivery destination 180 designated by customer 105. In some instances, a remote operator or a remote computer (e.g., retailer computing device 150) may temporarily or permanently take over operation of the ATV 110 using feedback information from the ATV 110 (e.g., audio and/or video content, sensor information, etc.) communicated to a remote navigation center and/or central control system (e.g., via network 135 or other similar distributed network). As mentioned above, the ATV 110 may be an autonomous ground vehicle (AGV) or an unmanned aerial vehicle (UAV).

The exemplary ATV 110 of FIG. 1 includes one or more data stores 112, sensors 114, and emitters 116 each in communication with one or more control circuits 118. In some aspects, emitter 116 and sensor 114 are implemented together through a single device. The ATV 110 deployed in some embodiments of the exemplary system 100 does not require physical operation by a human operator and wirelessly communicates with, and is wholly or largely controlled by, the retailer computing device 150. For example, the retailer computing device 150 may control directional (e.g., ground-based on airborne) movement of the ATV 110 toward/away from the home location 160 and/or delivery destination 180 based on a variety of inputs.

In some approaches, as discussed above, the control circuit 210 of the retailer computing device 150 is programmed to analyze the relative GPS coordinates of the ATV 110, home location 160 and/or delivery destination 180 and to generate a route for the ATV 110 to the home location 160 and/or to the delivery destination 180, and to transmit the generated delivery route to the ATV 110, thereby guiding the ATV 110 toward/away from the delivery destination 180 and/or toward/away from the home location 160. In some aspects, instead of relying on receipt of a delivery route from the retailer computing device 150, the control circuit 118 of the ATV 110 is programmed with GPS coordinates of home location 160 and delivery destination 180 where the products 190 are to be delivered, and is configured to determine a route for the ATV 110 to/from the home location 160 and to/from the delivery destination 180, as well as to cause the ATV 110 to move toward the home location 160 and/or delivery destination 180 without receiving route instructions from the retailer computing device 150. Such embodiments may advantageously reduce the processing load on the retailer computing device 150.

In some embodiments, the emitter 116 is configured as a two-way transceiver that can receive the route instructions transmitted from the retailer computing device 150 and that can send one or more signals to the retailer computing device 150. For example, as described above, the retailer computing device 150 may be configured to analyze the GPS coordinates of the home location 160 (e.g., product hand-off area 165) and of the delivery destination 180 (e.g., product drop-off area 175), to determine a route for the ATV 110 to the delivery destination 180, and to transmit to the ATV 110 a signal over the network 135 including route instructions to guide the ATV 110 from the home location 160 of customer 115 to the delivery destination 180 designated by customer 105 along the route determined by the retailer computing device 150. In turn, the ATV 110, upon receipt of such a signal from the retailer computing device 150 over the network 135, is configured to navigate, based on the route instructions, from the home location 160 to the delivery destination 180 while retaining the products 190 ordered by customer 105 therein.

In some embodiments, the emitter 116 of the ATV 110 is configured to transmit, via the network 135, a signal including an electronic confirmation that the products 190 ordered by customer 105 has been delivered by the ATV 110 to the delivery destination 180 designated by customer 105. In one approach, in response to receipt from the ATV 110 of the electronic confirmation that the product 190 ordered by the customer has been delivered to the delivery destination 180 (e.g., to the product drop off area 175) designated by customer 105, the retailer computing device 150 is configured to transmit, to the computing device 120 of customer 105, an electronic alert indicative of such a delivery. In some aspects, based on the route instructions or a separate signal received from the retailer computing device 150, the ATV 110 is configured to remain at the product drop off area 175 of the delivery destination 180 while retaining the products 190 ordered by customer 105 therein for a period of time indicated in the route instructions or in a separate control signal.

In some embodiments, the ATV 110 is configured to, in response to either a control signal from the retailer computing device 150, or a verification code entered by customer 105 or a person authorized by customer 105 to accept the delivery, to permit customer 105 or an authorized person to retrieve the package (containing the products 190 ordered by customer 105) from an interior cargo space 119 of the ATV 110 at the delivery destination 180 (e.g., product drop off area 175). According to some embodiments, the emitter 116 of the ATV 110 is also configured to transmit, via the network 135, a signal including an electronic confirmation that the product 190 ordered by the customer 105 (or an authorized person) from the ATV 110 at the delivery destination 180. In some approaches, in response to receipt of such an electronic confirmation from the ATV 110, the retailer computing device 150 is configured to transmit route instructions to the ATV 110 to guide the ATV 110 to the next delivery destination 180 or to a deployment station of the ATV 110.

In some embodiments, the ATV 110 includes one or more propulsion systems (e.g., motors, wheels, tank treads, etc.) that enable the ATV 110 to at least accelerate, deaccelerate, and/or traverse an environment using a navigation coordinate system, such as GPS, coordinate mapping information, beacon location information, cellular signal triangulation, other navigation systems and/or information, or a combination of two or more of such navigation systems and/or information. Further, the navigation coordinate system can be configured to provide location information, and in some instances time information. In some embodiments, the ATV 110 is configured to operate in different weather conditions, and/or can be readily modified depending on expected weather conditions (e.g., wheels replaced with tank treads when it is anticipated that the ATV 110 may encounter snow and/or ice). The ATV 110 can, in some applications, be further configured to communicate with other transport vehicles (e.g., AGVs, UAVs, manned transport vehicles), multiple different types of computing devices, a remote central control system, other computing devices, remote databases, and/or other such devices.

In some embodiments, the emitter 116 of the ATV 110 is a wired or a wireless transceiver configured to convey information, notifications, warnings and/or deterrents to a customer, a worker of the retailer, a potential threat (e.g., animal, person that is a potential threat), unknown third party, a remote central control system, a security service, a municipal police service, other such entities, or combination of two or more of such entities. The emitter 116 can comprise one or more output devices (e.g., speakers, displays, whistles, buzzers, lights and similar items) that convey text, audio, and/or visual signals. In some embodiments, emitter 116 can be configured to convey notifications having textual, audible and/or visual content. Similarly, the emitter 116 may additionally or alternatively be configured to facilitate wireless data communications with a computing device, including but not limited to, retailer computing device 150.

The exemplary ATV 110 further includes one or more sensors 114. The sensors 114 can include substantially any relevant device that provides information to the ATV 110 to be used in navigation, customer detection, potential threat detection, distance measurements, environment mapping, location determination, and/or other such sensor information. In some embodiments, the sensor 114 includes one or more devices that can be used to capture data related to one or more objects located within a threshold distance relative to the ATV 110. For example, the ATV 110 includes at least one sensor 114 configured to detect at least one obstacle between the ATV 110 and the delivery destination 180 along the route determined by the retailer computing device 150 for the ATV 110. Based on the detection of one or more obstacles by such a sensor 114, the ATV 110 is configured to avoid the obstacle(s) and/or the control circuit 210 of the retailer computing device 150 may be programmed to adjust the delivery route of the ATV 110 to avoid the obstacles(s) and/or to abort the delivery mission of the ATV 110 if the obstacle(s) cannot be successfully avoided.

In some embodiments, one or more sensors 114 can be included and/or cooperated with the ATV 110 that include, but are not limited to, one or more sensors to detect an object within one or more threshold or predetermined distances of the ATV 110, capture data within a threshold distance relative to ATV 110, detect movement, measure temperature, capture images and/or video, capture thermographic, infrared, and/or multi spectral images, capture images of entities attempting to tamper with ATV 110, one or more accelerometers, one or more gyroscopes, one or more odometers, one or more location sensors, one or more microphones (e.g., which can be configured to capture audible authentication codes and/or voice prints, threatening language, verbal input from customers, verbal inquiries from customers, etc.), one or more distance measurement sensors (e.g., laser sensors, sonar sensors, sensors that measure distance by emitting and capturing a wireless signal (which can comprise light and/or sound) etc.), 3D scanning sensors, other such sensors, or a combination of two or more of such sensors. In some aspects, the ATV 110 includes one or more sensors 114 in communication with one or more access panels of ATV 110 and/or positioned adjacent to such access panels to sense when such panels are tampered with.

In some embodiments, the ATV 110 includes a sensor 114 configured to detect a product hand-off area 165 at the home location 160, where customer 115, after picking up one or more packages containing one or more products 190 ordered by customer 105 (and/or other additional customers of the retailer) at the sales facility 170, dropped off such package(s). In one aspect, after detecting the product hand-off area 165 via a sensor 114 (e.g., a video camera), the ATV 110 is configured to identify, via a sensor 114 of the ATV 110 the product-containing package that is specific to customer 105. Such an identification of the package may occur when customer 115 attempts to load the package into the ATV 110 and/or when the ATV 110 attempts to automatically load the package dropped off by customer 115 at the product hand-off area 165.

In some embodiments, the sensors 114 of the ATV 110 are configured to scan identifying indicia located on the packages (or products 190) dropped off but customer 115 (or attempted to be loaded into the ATV 110 by customer 115) in the product hand-off area 165. The identifying indicia on the package or product 190 that may be scanned by the sensors 114 may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes. In some aspects, the sensors 114 of the ATV 110 may include but are not limited to one or more of: a motion-detecting sensor (e.g., to detect a package being manually loaded into the ATV 110 by customer 115), a photo sensor, a radio frequency identification (RFID) sensor, an optical sensor, a barcode sensor, a digital camera sensor, a size sensor, a volumetric sensor, and a temperature sensor, or the like.

In some embodiments, the ATV 110 includes sensors 114 configured to recognize actual physical characteristic information and/or actual identifying characteristic information associated with the products 190 being loaded into the ATV 110 and/or being picked up by the ATV 110. In some aspects, the sensors 114 can detect actual physical characteristic information of the products 190 including but not limited to: dimensional characteristics (e.g., size and shape) of the product(s) 190; weight of the product(s) 190; volume of the product(s) 190, temperature of the product(s) 190, smell generated by the product(s) 190; exterior texture of the product(s) 190, hazardous material emissions of the product(s) 190, explosive potential of the product(s) 190, tamper-evidence status of the product(s) 190, etc.

In some aspects, after detecting the product hand-off area 185 and identifying the package that is specific to customer 105 via one or more sensors 114, the ATV 110 is configured to load such a package (and, in some aspects, additionally other packages containing products 190 destined to one or more other customers of the retailer) into the cargo space 119 of the ATV 110. For example, in one aspect, the cargo space 119 of the ATV 110 may include an opening configured to permit one or more product-containing packages to pass therethrough and cover (e.g., sliding door, panel, etc.) movable from a first (closed) position, where the cover covers the opening to a second (open) position, where the cover does not cover at least a portion of the opening of the cargo space 119 to permit a package containing the products 190 to be loaded into the cargo space 119 to pass through the opening and into the interior of the cargo space 119. Generally, the ATV 110 may be equipped with any mechanism configured to facilitate the lifting and/or grasping and loading of product-containing packages from the product hand-off area 165 into the cargo space 119 of the ATV 110. Such mechanisms may include but are not limited to mechanical arms, aerial cranes, scooping devices (e.g., trays, panels, etc.), chutes, or the like.

After the identified and validated package or packages containing the products 190 ordered by customer 105 and/or other customers is loaded into the ATV 110, the ATV 110 is configured to deliver such package(s) to one or more delivery destinations 180. As described above, the ATV 110 may be guided from the home location 160 to the delivery destination 180 via route instructions received from the retailer computing device 150 and/or generated by the control circuit 118 of the ATV 110. In some embodiments, the ATV 110 includes one or more sensors 114 configured to detect the delivery destination 180 where the package containing the products 190 ordered by customer 105 is to be dropped off and/or retrieved by customer 105. For example, one or more sensors 114 of the ATV 110 may be configured to detect letters (to detect street names) and/or numbers (to detect house numbers on curbs and/or on fences and/or on houses) in order to detect and validate the delivery destination 180. For example, the emitter 116 ATV 110 can be configured to transmit sensor data including the combination of numbers detected by the sensor 114 at the possible delivery destination 180 to the retailer computing device 150, enabling the retailer computing device 150 to authenticate the delivery destination 180 based on the received sensor data. In some embodiments, the sensor 114 is configured to detect the delivery destination 180, for example, via detecting a transmitter (e.g., a beacon) installed at the delivery destination and specific to customer 105.

In some embodiments, after arriving at the delivery destination 180, the ATV is configured to drop the package containing the products 190 ordered by customer 105 from the cargo space 119 of the ATV 110 at a product drop off area 175. Such a product drop off area 175 may be, for example, a drop off pad including one or more sensors configured to permit the ATV 110 to recognize the drop off pad. In some embodiments, after arriving at the delivery destination 180, the ATV 110 is configured to permit customer 105 (or a person authorized to accept delivery on behalf of customer 105) to retrieve the package containing the products 190 ordered by customer 105 from the cargo space 119 of the ATV 110 at the product drop off area 175. As described above, the ATV 110 may be configured to permit customer 105 or another person to access the cargo space 119 of the ATV 110 only after authentication of the recipient via one or more of the sensors 114 of the ATV 110.

In some embodiments, one or more data stores 112 provide an information repository that typically stores programs 111 and files 113. The ATV 110 may, in some embodiments, further access one or more programs 111, files 113, and/or other relevant information external to ATV 110 and accessible via network 135. Files 113 can comprise information transmitted by the retailer computing device 150, data captured by the sensor 114, customer information, customer identifier information, computing device identifier information, product information, customer order information, navigation and/or routing information, location information, mapping information, ATV identifier information, communication procedures, threat information, sensor data, images, video, and/or other such information. For example, in some embodiments, files 113 can further comprise one or more notification templates, which are software used by the ATVs 110 as a basis to convey salutations and/or advertisements to customers and/or pedestrians located within a threshold distance relative to the ATVs 110. Notification template's content may at least be provided by product manufacturers and/or owners of the ATVs 110. In some embodiments, notification templates may further be personalized using customer's specific information to, for example, target a specific customer and increase engagement between the customer and the ATV 110. Personalized notifications can reference customer history, current needs, anticipated needs, and/or similar information that can increase the probability that people who see such notifications make product and/or service purchases from the retailer. Commercial product information and/or customer-specific information may be added to notification templates prior to their transmission by the ATVs 110 when the presence of customers and/or pedestrians is detected by the ATV 110.

Commercial product information can include, for example, product names, product types, manufacturer names, manufacturer origin, ingredient names, ingredient types, component names, and/or component types. Notification templates can comprise audio and/or visual components, for example, music, speech, tones, images, and/or video. Files 113 can further comprise personal and/or non-public information about the customers, including but not limited to, information about browser history, location, birthdays, delivery dates, spouses, pets, and/or heirs associated with the customers. Files 113 can comprise predetermined biometric data associated with the customers, which can be used for authentication purposes, and/or determining unknown and/or hostile third parties. Applicable biometric data can include, but is not limited to voice prints, iris patterns, retina-patterns, hand geometries, earlobe geometries, facial landmarks, thermographic signatures, vascular patterns, skin texture data points, and/or walking gate data points. Predetermined biometric data can include data captured by the sensors 114, provided by the customers, external sensors, and/or received from an external central computing system.

As described above, the ATV 110 further includes programs 111 that are stored in the data store 112 and/or other memory, and utilized at least by the one or more control circuits 118. In some applications, one or more of the programs 111 are software that are executed by the one or more control circuits 118 to facilitate the operation, control, commercial activity, interaction with customers, deterring potential danger and the like to the ATV 110. For example, the one or more control circuits 118, in executing one or more programs 111, can use data generated by sensors 114 to detect when customers or hostile third parties are positioned within a threshold distance relative to the ATVs 110, generate notifications in response to detecting the presence of customers and/or hostile third parties, as well as generate notifications in response to receiving triggering events from the retailer computing device 150. For example, the presence of customer 105 positioned within a threshold distance relative to ATVs 110 can be confirmed using geolocation data, which reflects the location of the customer 105, received from the retailer computing device 150 (e.g., based on GPS data obtained from the computing device 120).

Hostile third parties can refer to any human or animal or autonomous vehicle attempting to interfere with the operation of ATV 110, which may, for example, be characterized as any attempts to gain unauthorized access to the cargo space 119 of the ATV 110, attempts to gain unauthorized access to the ATV 110 software and/or hardware, attempts to gain unauthorized access to products 190 being transported by the ATV 110, attempt to damage the ATV 110, attempts to obstruct the travel path of ATV 110, and/or other activities that may be detrimental to the ATV 110, and/or interfere with the ATV 110.

Additionally or alternatively, control circuit 118, in executing one or more programs 111, can generate one or more types of biometric data (discussed above) using information captured via sensor 114, and determine whether the generated biometric data has one or more threshold relationships to predetermined biometric data included in files 113, wherein generated biometric data having threshold relationships identify customers and such data lacking the threshold relationships identify unknown and/or hostile third parties.

FIG. 3 shows a method 300 of delivering products 190 purchased by customers of the retailer over the internet according to some embodiments. The exemplary method 300 illustrated in FIG. 3 includes receiving, at a retailer computing device 150 including a processor-based control circuit, a first electronic notification indicating availability of a first customer 115 of the retailer for product pick up at a sales facility 170 of the retailer (step 310). As mentioned above, customer 115 may be available for product pick up because he/she is going to the sales facility 170 to, for example, shop for products 190, pick up pre-ordered products 190, return a previously purchased product 190, or for any other reason. In some aspects, such a first electronic notification may be transmitted to the retailer computing device 150 by customer 115 via the customer computing device 125 of customer 115 over the network 135.

The method 300 of FIG. 3 further includes transmitting, via the retailer computing device 150, a second electronic notification to a computing device 120 of one or more other customers 105 of the retailer, with the second notification permitting such customer(s) 105 to place one or more orders for one or more products 190 to be picked up, at the sales facility 170, by the first customer 115 (step 320). In some aspects, if, customer 105 who receives a notification transmitted via the retailer computing device 150 chooses to order one or more products from the retailer, and agrees to the option of having the ordered products 190 be picked by customer 115 at the sales facility 170 and delivered to the delivery destination 180 selected by customer 105 by an ATV 110 as described above, the indication of the attempted order by customer 105 is transmitted from the computing device 120 of customer 105 to the retailer computing device 150 over the network 135. To that end, the method 300 of FIG. 3 includes receiving, via the retailer computing device 150, a third electronic notification from the computing device 120 of customer 105, with the third electronic notification indicating the order for one or more products 190 placed by customer 105 to be picked up at the sales facility 170 by customer 115 (step 330).

Assuming that customer 115 agrees to pick up the products 190 ordered by customer 105 at the sales facility 170 as described above, the method 300 further includes permitting customer 115 to pick up, at the sales facility 170, the order placed by customer 105 (step 340). For example, the products 190 ordered by customer 105 may be packaged in packages that do not reveal the identity of the products 190 (and/or the identity/address of customer 105) to customer 115, and then picked up by customer 115 either at a counter inside of the sales facility 170, or via a drive through window at the sales facility 170. As discussed above, after customer 115 picks up one or more packages containing products 190 ordered by one or more customers 105, customer 115 may then drive to the home location 160 of customer 115 (which may be the home and/or a business of customer 115 as described above).

In some embodiments, as described in more detail above, the retailer computing device 150 is configured to analyze various availability factors associated with the ATVs 110, and to select an ATV 110 most suitable for picking up the products 190 at the home location 160 and delivering the products 190 to the delivery destination 180 selected by customer 105. In the embodiment illustrated in FIG. 3, the method 300 includes analyzing, via the retailer computing device 150, at least a physical location, a maximum cargo capacity, and a delivery route of a plurality of ATVs 110 to determine an availability ranking of the ATVs 110 for delivering the products 190 from the home location 160 to the delivery destination 180 designated by customer 105 (step 350). As discussed above, the control circuit 210 of the retailer computing device 150 is programmed to generate the availability ranking based on more than the three factors depicted in FIG. 3. The method 300 depicted in FIG. 3 includes selecting an ATV 110 determined to have the highest availability ranking for delivering the products ordered by customer 105 from the home location 160 of customer 115 to customer 105 of the retailer (step 360).

After the retailer computing device 150 selects an ATV 110 that has the highest availability ranking (according to the analysis performed by the control circuit 210 of the retailer computing device 150), the exemplary method 300 of FIG. 3 further includes transmitting delivery route instructions to the selected ATV 110 (step 370). As described above, the retailer computing device 150 is configured to obtain global positioning system (GPS) coordinates of the home location 160 of customer 115 (where customer 115 will hand off the products 190 picked up at the sales facility 170 to the ATV 110) and the delivery destination 180 designated by customer 105, and to analyze the relative geographic locations of the home location 160 and delivery destination 180 to determine a delivery route for the ATV 110 to the home location 160 (from a ATV-deploying mothership or from a previous order pick up or delivery location) and/or to the delivery destination 180 designated by customer 105.

After the retailer computing device 150 selects the ATV 110 for delivering the products 190 to customer 105 and determines the delivery route for the ATV 110 as described above, the next step of the exemplary method 300 is providing the selected ATV 110 at a home location 160 of the first customer 115 (step 375). As described above, the ATV 110 includes one or more sensors 114 that indicate the GPS location and/or coordinates of the ATV 110. As such, in some aspects, the retailer computing device 150 is configured to obtain GPS coordinates of the ATV 110 and the home location 160 and/or the product hand-off area 165 where the products 190 may be dropped off for the ATV 110 to pick up and/or loaded by customer 115 into the ATV 110, and to analyze the relative geographic locations of the ATV 110 and the product hand-off area 165 at the home location 160 in order to determine a route for the ATV 110 to the product hand-off area 165. Such a route, when transmitted by the retailer computing device 150 to the ATV 110 enables the ATV 110 to navigate to the home location 160 and/or hand-off area 165 from its initial position (e.g., mothership or a previous product pick up or delivery).

As described above, after the ATV 110 arrives at the home location 160 of customer 115, the ATV 110 configured to locate the product hand-off area 165 and to detect (i.e., identify) a package in the product hand-off area 165 that is specific to customer 105, and to then load the identified and validated package into the cargo space 119 of the ATV 110. To that end, the method 300 includes detecting, via at least one sensor 114 of the selected ATV 110, a product hand-off area 165 at the home location 160 of customer 115, where the order picked up by customer 115 at the sales facility 170 is dropped off by customer 115 (step 380). In addition, the method 300 includes identifying, via at least one sensor 114 of the selected ATV 110, the package containing the order picked up by customer 115 for customer 105 at the sales facility 170 (step 385). The method 300 further includes the step of loading the at least one package (containing products 190 ordered by customer 105) identified in the product hand-off area 165 into the interior of the selected ATV 110 (step 490).

After the products 190 are loaded into the ATV 110 in the product hand-off area 165 at the home location 160 of customer 115, the exemplary method 300 of FIG. 3 further includes delivering, via the selected ATV 110 and based on the delivery instructions received from the retailer computing device 150, the package(s) loaded into the interior of the selected ATV 110 at the product hand-off area 165 to the geographic location (e.g., delivery destination 180) of the other customer 105 who placed the order to be picked up by customer 115 (step 495).

In some embodiments, after the ATV 110 arrives to the delivery destination 180 where the product drop off area 175 is located, the ATV 110, which is already programmed with the GPS coordinates of the delivery destination 180, attempts to verify the identity of the delivery destination 180 by attempting to detect (via the sensor 114) the combination of letters and/or numbers (e.g., house numbers of a curb) that are indicative of a physical address associated with the delivery destination 180 associated with the GPS coordinates. In one approach, as described above, the address information associated with customer 105 (and the delivery destination 180) is stored in the customer information database 140, and can be obtained for verification purposes either by the ATV 110 directly, or by the retailer computing device 150 after the ATV 110 transmits sensor data including the combination of letters and numbers detected by the sensor 114 on the street and/or on a curb and/or on a house/building where the delivery is being attempted, which enables the retailer computing device 150 to authenticate the delivery destination 180.

After authentication of the delivery destination 180 where the package containing the products 190 being transported by the ATV 110 is to be delivered, in some embodiments, the ATV 110 transmits (e.g., via the emitter 116 over the network 135) a signal including an electronic confirmation that the product 190 ordered by customer 105 has been delivered by the ATV 110 to the delivery destination 180 designated by customer 105. In one approach, such an electronic confirmation is sent directly to the retailer computing device 150, although the electronic confirmation may be instead sent to the customer information database 140 for retrieval by the retailer computing device 150. In some embodiments, after receipt from the ATV 110 of such an electronic confirmation, the retailer computing device 150 transmits an electronic notification to a computing device 120 of customer 105 to notify customer 105 that the product 190 ordered by customer 105 has been delivered to the delivery destination 180 designated by customer 105.

As mentioned above, in some aspects, when the route instructions transmitted to the ATV 110 by the retailer computing device 150 include an instruction to the ATV 110 to remain at the product drop off area 175 for a predetermined interval of time (e.g., 15 minutes, 30 minutes, 1 hour, or more than 1 hour), the ATV 110 is configured to remain at the product drop off area 175 for the period of time indicated in the route instructions, and the electronic notification transmitted by the retailer computing device 150 to the customer computing device 120 includes an indication of the interval of time that the ATV 110 will wait at the product drop off area 175 for customer 105 to retrieve the package containing the product(s) 190 from the cargo space 119 of the ATV 110. In some embodiments, the electronic notification transmitted by the retailer computing device 150 to the customer computing device 120 includes a verification code that customer 105 would be required to provide to the ATV 110 (either via the customer computing device 120 or by manually entering via an interface of the ATV 110) in order to gain access to the cargo space 119 of the ATV 110.

As described above, instead of a verification code that must be entered or otherwise transmitted by customer 105, the ATV 110 according to some embodiments is equipped with a sensor 114 configured to detect biometric data associated with customer 105, enabling the verification of customer 105 via the biometric data detected by the sensor 114. As described above, the ATV 110, in response to either a control signal from the retailer computing device 150, or a verification code or biometric data entered by customer 105, permits customer 105 to retrieve the product 190 ordered by customer 105 from the cargo space 119 of the ATV 110. For example, after customer 105 or person attempting to retrieve the product 190 from the ATV 110 is authenticated as being authorized, the ATV 110 either opens the cargo space 119 to permit customer 105 to remove the product 190 from the cargo space 119, or ejects the product 190 from the cargo space 119 without opening the cargo space 119 to access by the customer.

In addition, in some configurations, the emitter 116 of the ATV 110 is also configured to transmit, via the network 135, a signal including an electronic confirmation that the product 190 ordered by customer 105 has been successfully retrieved by customer 105 from the ATV 110 at the product drop off area 175 of the delivery destination 180 designated by customer 105. In one approach, in response to receipt of such an electronic confirmation from the ATV 110, the retailer computing device 150 transmits a signal including updated route instructions to the ATV 110 to guide the ATV 110 back to a deployment station of the ATV 110, or to another delivery destination 180 to drop off other product-containing packages for other customers of the retailer for whom customer 115 picked up the packages at the sales facility 170. In turn, the ATV 110, upon receipt of such a signal from the retailer computing device 150, navigates either back to a deployment station or to the next delivery destination based on the updated route instructions. In some embodiments, in response to receipt of the electronic confirmation from the ATV 110 that an authorized customer 105 retrieved the product 190 from the ATV 110, the retailer computing device 150 transmits a signal to the order processing server 130 indicating that the order placed by customer 105 has been successfully completed.

The systems and methods described herein advantageously allow customers to purchase products from a retailer and have the products conveniently delivered to their designated delivery destinations after being picked up by another customer of the retailer from a sales facility of the retailer and dropped off at the delivery destination by an autonomous transport vehicle, which takes over the delivery after the customer who picks up the products arrives to his or her location and drops off the products and/or loads them into the autonomous transport vehicle. As such, the systems and methods described herein provide a significant convenience for the customer of the retailer who picks up the products, since that customer does not have to deliver the products to various destinations, but can simply drop off the products picked up at the retail store at his/her home location for the autonomous transport vehicle to pick up while potentially getting reimbursed for his or her product pick up services. In addition, such systems and methods provide retailers with significant operation cost savings, since a portion of the deliveries are made via autonomous ground vehicles that do not require a human operator.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for delivering of products purchased by consumers over the internet from a retailer, the system comprising:
   a retailer computing device including a processor-based control circuit, the retailer computing device configured to:
      receive a first electronic notification indicating availability of a first customer of the retailer for product pick up at a sales facility of the retailer;
      transmit a second electronic notification to a computing device of the at least one other customer of the retailer, the second electronic notification permitting the at least one other customer of the retailer to place at least one order for at least one product to be picked up, at the sales facility of the retailer, by the first customer of the retailer;
      receive a third electronic notification from the customer device of the at least one other customer of the retailer, the third electronic notification indicating the at least one order, placed by the at least one other customer of the retailer for the at least one product to be picked up, at the sales facility of the retailer, by the first customer of the retailer; and
      receive an indication that the first customer of the retailer picked up, at the sales facility of the retailer, at least one package containing the at least one order placed by the at least one other customer of the retailer; and
   a plurality of autonomous transport vehicles each including an interior and configured to receive, at a home location of the first customer, in the interior, the at least one package containing the at least one order picked up, at the sales facility of the retailer, by the first customer of the retailer for the at least one other customer of the retailer;

wherein the retailer computing device is configured to:
analyze at least a physical location, a maximum cargo capacity, and a delivery route of each of the autonomous transport vehicles to determine an availability ranking of the autonomous transport vehicles for delivering the at least one order to the at least one customer of the retailer;
select the autonomous transport vehicle determined by the retailer computing device to have a highest availability ranking for delivering the at least one order to the at least one customer of the retailer, and
transmit delivery route instructions to the selected autonomous transport vehicle; and wherein the selected autonomous transport vehicle is configured, in response to receipt of the delivery route instructions from the retailer computing device, to:
detect, via at least one sensor of the selected autonomous transport vehicle, a product hand-off area at the home location of the first customer where the at least one package containing the at least one order picked up by the first customer of the retailer at the sales facility of the retailer is dropped off by the first customer of the retailer;
identify, via the at least one sensor of the selected autonomous transport vehicle, the at least one package containing the at least one order picked up by the first customer of the retailer for the at least one other customer of the retailer;
load the at least one package identified in the product hand-off area into the interior of the selected autonomous transport vehicle at the product hand-off area; and
deliver, based on the delivery instructions received from the retailer computing device, the at least one package loaded into the interior of the selected autonomous transport vehicle at the product hand-off area to the geographic location of the at least one other customer of the retailer.

2. The system of claim 1, wherein the retailer computing device is further configured to:
obtain global positioning system (GPS) coordinates of the geographic location of the at least one other customer of the retailer who placed the at least one order;
analyze the obtained GPS coordinates;
determine, based on the analyzed GPS coordinates, a route for the selected autonomous transport vehicle to the geographic location of the at least one other customer of the retailer who placed the at least one order; and
transmit a fifth electronic notification to the selected autonomous transport vehicle including the delivery route instructions to guide the selected autonomous transport vehicle to the geographic location of the at least one other customer of the retailer who placed the at least one order;
wherein the selected autonomous transport vehicle, upon receipt of the fifth electronic notification from the retailer computing device, is configured to navigate, based on the delivery route instructions, to the geographic location of the at least one other customer of the retailer who placed the at least one order while retaining the at least one package in the interior of the selected autonomous transport vehicle.

3. The system of claim 1, wherein the selected autonomous transport vehicle is configured to at least one of:
drop the at least one package from the interior of the selected autonomous transport vehicle at a drop off spot at the geographic location of the at least one other customer of the retailer; and
permit the at least one other customer of the retailer to retrieve the at least one package from the interior of the selected autonomous transport vehicle.

4. The system of claim 1, wherein the retailer computing device is further configured to:
identify at least one other customer of the retailer located within a predefined geographic radius of the home location the first customer of the retailer; and
provide, in the second electronic notification, a graphical interface including at least one input field configured to enable the at least one other customer of the retailer to select the at least one product and to place the at least one order to be picked up, at the sales facility of the retailer, by the first customer of the retailer.

5. The system of claim 1, wherein the retailer computing device is further configured to, after receipt of the third electronic notification, transmit a fourth electronic notification to a computing device of the first customer of the retailer, the fourth electronic notification including a graphical interface configured to permit the first customer to indicate agreement or disagreement to pick up, at the sales facility of the retailer, the at least one order for the at least one product ordered by the at least one other customer of the retailer.

6. The system of claim 1, further comprising an order processing server configured to process, after receipt of the third electronic notification by the retailer computing device, the at least one order for the at least one product placed by the at least one other customer of the retailer.

7. The system of claim 1, wherein the at least one package containing the at least one order does not include a visible indication, to the first customer, of the at least one product contained in the at least one package picked up by the first customer from the retail sales facility.

8. The system of claim 1, wherein the retailer computing device is further configured to provide an indication in the second electronic notification of an extra charge to the at least one other customer of the retailer for having the first customer of the retailer pick up the at least one order for the at least one other customer of the retailer at the sales facility of the retailer.

9. The system of claim 8, wherein the retailer computing device is further configured to initiate a credit of the extra charge to an account of the first customer of the retailer for picking up the at least one order for the at least one other customer of the retailer at the sales facility of the retailer.

10. The system of claim 1, wherein the first, second, and third electronic notifications comprise at least one of: a mobile app notification, a short-message-service (SMS) message, an electronic mail, and an instant messenger message.

11. A method of delivering products purchased by consumers over the internet from a retailer, the method comprising:
receiving, at a retailer computing device including a processor-based control circuit, a first electronic notification indicating availability of a first customer of the retailer for product pick up at a sales facility of the retailer;

transmitting, via the retailer computing device, a second electronic notification to a computing device of the at least one other customer of the retailer, the second electronic notification permitting the at least one other customer of the retailer to place at least one order for at least one product to be picked up, at the sales facility of the retailer, by the first customer of the retailer;

receiving, via the retailer computing device, a third electronic notification from the computing device of the at least one other customer of the retailer, the third electronic notification indicating the at least one order, placed by the at least one other customer of the retailer for the at least one product to be picked up, at the sales facility of the retailer, by the first customer of the retailer;

permitting the first customer of the retailer to pick up, at the sales facility of the retailer, at least one package containing the at least one order placed by the at least one other customer of the retailer;

analyzing, via the retailer computing device, at least a physical location, a maximum cargo capacity, and a delivery route of a plurality of autonomous transport vehicles to determine an availability ranking of the autonomous transport vehicles for delivering the at least one package to the at least one customer of the retailer;

selecting, via the retailer computing device, an autonomous transport vehicle determined by the retailer computing device to have a highest availability ranking for delivering the at least one package to the at least one other customer of the retailer;

transmitting, via the retailer computing device, delivery route instructions to the selected autonomous transport vehicle;

providing the selected autonomous transport vehicle at a home location of the first customer;

in response to receipt by the selected autonomous transport vehicle of the delivery route instructions from the retailer computing device:
 detecting, via at least one sensor of the selected autonomous transport vehicle, a product hand-off area at the home location of the first customer where the at least one package containing the at least one order picked up by the first customer of the retailer at the sales facility of the retailer is dropped off by the first customer of the retailer;
 identifying, via the at least one sensor of the selected autonomous transport vehicle, the at least one package containing the at least one order picked up by the first customer of the retailer for the at least one other customer of the retailer;
 loading, via the selected autonomous transport vehicle, the at least one package identified in the product hand-off area into the interior of the selected autonomous transport vehicle at the product hand-off area; and
 delivering, via the selected autonomous transport vehicle and based on the delivery instructions received from the retailer computing device, the at least one package loaded into the interior of the selected autonomous transport vehicle at the product hand-off area to the geographic location of the at least one other customer of the retailer who placed the at least one order.

12. The method of claim 11, wherein the delivering step further comprises:
 obtaining, via the retailer computing device, global positioning system (GPS) coordinates of the geographic location of the at least one other customer of the retailer who placed the at least one order;
 analyzing, via the control circuit of the retailer computing device, the obtained GPS coordinates;
 determining, based on the analyzed GPS coordinates, a route for the selected autonomous transport vehicle to the geographic location of the at least one other customer of the retailer who placed the at least one order; and
 transmitting, via the retailer computing device, a fifth electronic notification to the selected autonomous transport vehicle including the delivery route instructions to guide the selected autonomous transport vehicle to the geographic location of the at least one other customer of the retailer who placed the at least one order, the selected autonomous transport vehicle, upon receipt of the fifth electronic notification from the retailer computing device, navigating, based on the route instructions, to the geographic location of the at least one other customer of the retailer who placed the at least one order while retaining the at least one package in the interior of the selected autonomous transport vehicle.

13. The method of claim 11, wherein the delivering step further comprises at least one of:
 dropping the at least one package from the interior of the selected autonomous transport vehicle at a drop off spot at the geographic location of the at least one other customer of the retailer; and
 permitting the at least one other customer of the retailer to retrieve the at least one package from the interior of the selected autonomous transport vehicle.

14. The method of claim 11, wherein the step of transmitting the second electronic notification further comprises:
 identifying, via the retailer computing device, at least one other customer of the retailer located within a predefined geographic radius of the home location the first customer of the retailer; and
 providing, in the second electronic notification, a graphical interface including at least one input field configured to enable the at least one other customer of the retailer to select the at least one product and to place the at least one order to be picked up, at the sales facility of the retailer, by the first customer of the retailer.

15. The method of claim 11, further comprising, after the receiving, by the retailer computing device, of the third electronic notification, transmitting, via the retailer computing device, a fourth electronic notification to a computing device of the first customer of the retailer, the fourth electronic notification including a graphical interface configured to permit the first customer to indicate agreement or disagreement to pick up, at the sales facility of the retailer, the at least one order for the at least one product ordered by the at least one other customer of the retailer.

16. The method of claim 11, wherein the step of receiving, at the retailer computing device, the third electronic notification, further comprises, processing, at an order processing server of the retailer, the at least one order for the at least one product placed by the at least one other customer of the retailer.

17. The method of claim 11, wherein the permitting step further comprises providing the first customer with the at least one package including the at least one order for the at least one product placed by the at least one other customer of the retailer, the at least one package not including a visible indication, to the first customer, of the at least one product contained in the at least one package.

18. The method of claim 11, wherein the transmitting of the second electronic notification further comprises providing an indication in the second electronic notification of an extra charge to the at least one other customer of the retailer for having the first customer of the retailer pick up the at least one order for the at least one other customer of the retailer at the sales facility of the retailer.

19. The method of claim 18, wherein the delivering step further comprises crediting the extra charge to an account of the first customer of the retailer for picking up the at least one order for the at least one other customer of the retailer at the sales facility of the retailer.

20. The method of claim 11, wherein the first, second, and third electronic notifications comprise at least one of: a mobile app notification, a short-message-service (SMS) message, an electronic mail, and an instant messenger message.

\* \* \* \* \*